United States Patent [19]

Dufton et al.

[11] 3,729,718

[45] Apr. 24, 1973

[54] COMPUTER HAVING ASSOCIATIVE SEARCH APPARATUS

[75] Inventors: J. Peter Dufton, Brockville; Beverley G. Hallman, Ottawa, Ontario, both of Canada

[73] Assignee: GTE Automatic Electric Laboratories Incorporated, Northlake, Ill.

[22] Filed: Dec. 29, 1970

[21] Appl. No.: 102,414

[52] U.S. Cl. .......... 340/172.5

[51] Int. Cl. .......... G06f 7/00

[58] Field of Search .......... 179/18 ES; 340/172.5

[56] References Cited

UNITED STATES PATENTS

| | | | |
|---|---|---|---|
| 3,668,647 | 6/1972 | Evangelisti et al. | 340/172.5 |
| 3,618,037 | 11/1971 | Wollum et al. | 340/172.5 |
| 3,618,031 | 11/1971 | Kennedy et al. | 340/172.5 |
| R26,919 | 6/1970 | Hagelbarger et al. | 340/172.5 |

*Primary Examiner*—Harvey E. Springborn

*Attorney*—Theodore C. Jay, Jr., K. Mullerheim and B. E. Franz

[57] ABSTRACT

The central processor includes logic circuits for a plurality of operation codes, one of which is a special SCAN code for associative searches to find the address of a word in which given data is stored. The apparatus includes two comparison circuits, one connected to compare the contents of a general register with the memory output data, and the other connected to compare the contents of an accumulator register with a constant. The given data is first placed in the general register and the start address for the search is placed in the accumulator register. Then reading a single program instruction word containing the SCAN operation code causes data words to be read and compared as the address in the accumulator register continues to advance until either the given data word is found or the address corresponding to the constant is reached. During the search the instruction address register and the operation code instruction register are inhibited from changing so that all other program controlled processing is halted during the search.

1 Claim, 7 Drawing Figures

Patented April 24, 1973 3,729,718

7 Sheets-Sheet 1

INVENTORS
J. PETER DUFTON
BEVERLEY G. HALLMAN

BY Bernard E. Franz
ATTORNEY

Patented April 24, 1973 3,729,718

7 Sheets-Sheet 5

COMPUTER HAVING ASSOCIATIVE SEARCH APPARATUS

BACKGROUND OF THE INVENTION

1. Field of the Invention

This invention relates to computer apparatus for making associative searches initiated by a program word, particularly for use in a small real-time-control data processing system.

2. Description of the Prior Art

Associative search apparatus using comparator circuits to find the address of a word in memory at which given data is stored are well known. In many known systems only wired logic hardware apparatus is used including input control circuits, comparators, counters, and memory reading circuits; one example being a Magnetic Drum Translator by E. P. Kostogiannis and M. A. Langowski disclosed in U.S. Pat. no. 3,284,574 issued Nov. 8, 1966. It is known to initiate the operation of such wired logic associative search apparatus by a command from a program controlled central processor, and to return the result of the search to the central processor.

It is also well known to use a software approach for making associative searches in conjunction with central processors having operation codes and associated apparatus for performing such basic operations as store, load, compare, add, and branch. In this case a simple program loop may be provided in which the given data is placed in a general register and then successive program instructions provide for loading the data from a word, comparing it to the given data, and then either branching out of the loop on the condition that the given data is found, or adding one to the data address and branching to the beginning of the loop.

While the hardware approach is very useful in a large data processing system since the associative search may proceed while the main program proceeds to process other instructions; this approach does require a complete dedicated set of hardware for all of the functions required for the search and is therefore uneconomical for a small system. The software approach does not require any dedicated hardware for the associative searches, but it requires the execution of a number of instructions for each word searched and thus may require an excessive amount of time if several hundred words are to be searched.

SUMMARY OF THE INVENTION

This invention relates to a central processor using a special operation code SCAN for associative searches with a small amount of special apparatus and wiring associated with that operation code, but which also uses the accumulator and other registers and logic circuits required for the performance of other operation codes, with a single program word containing the operation code SCAN causing the reading of successive data words for the associative search.

The central processor had an operation cycle which is divided into a number of intervals, normally including one interval for reading a program instruction and another interval for reading a data word if required for the particular operation, with the operation code being read for each instruction into an instruction register and remaining there for the duration of each cycle to control the apparatus in performing the necessary functions. In the arrangement according to the invention, as long as no match is found either with the given data or the data address has not advanced to the value of a given constant, the interval for reading a new instruction is skipped during successive cycles and the operation code for SCAN remains in the instruction register. Therefore only one shortened operation cycle is used for reading each data word and performing the comparison functions, in contrast to the usual software method of making associative searches which requires reading a number of instructions and therefore uses a number of operation cycles for each data word.

CROSS-REFERENCES TO RELATED APPLICATIONS

This invention is related to the Small Exchange Stored Program Switching System by R. W. Duthie and R. M. Thomas disclosed in U.S. Pat. No. 3,487,173 issued Dec. 30, 1969. The memory arrangement of the system, and particularly the storage readout circuits SR for reading from temporary memory stores is disclosed in the U.S. patent application Ser. No. 883,062 filed Dec. 8, 1969, now U.S. Pat. No. 3,587,070 issued June 22, 1971, by R. M. Thomas for a Memory Arrangement Having Both Magnetic-Core And Switching-Device Storage With A Common Address Register.

DETAILED DESCRIPTION

Figure 1:
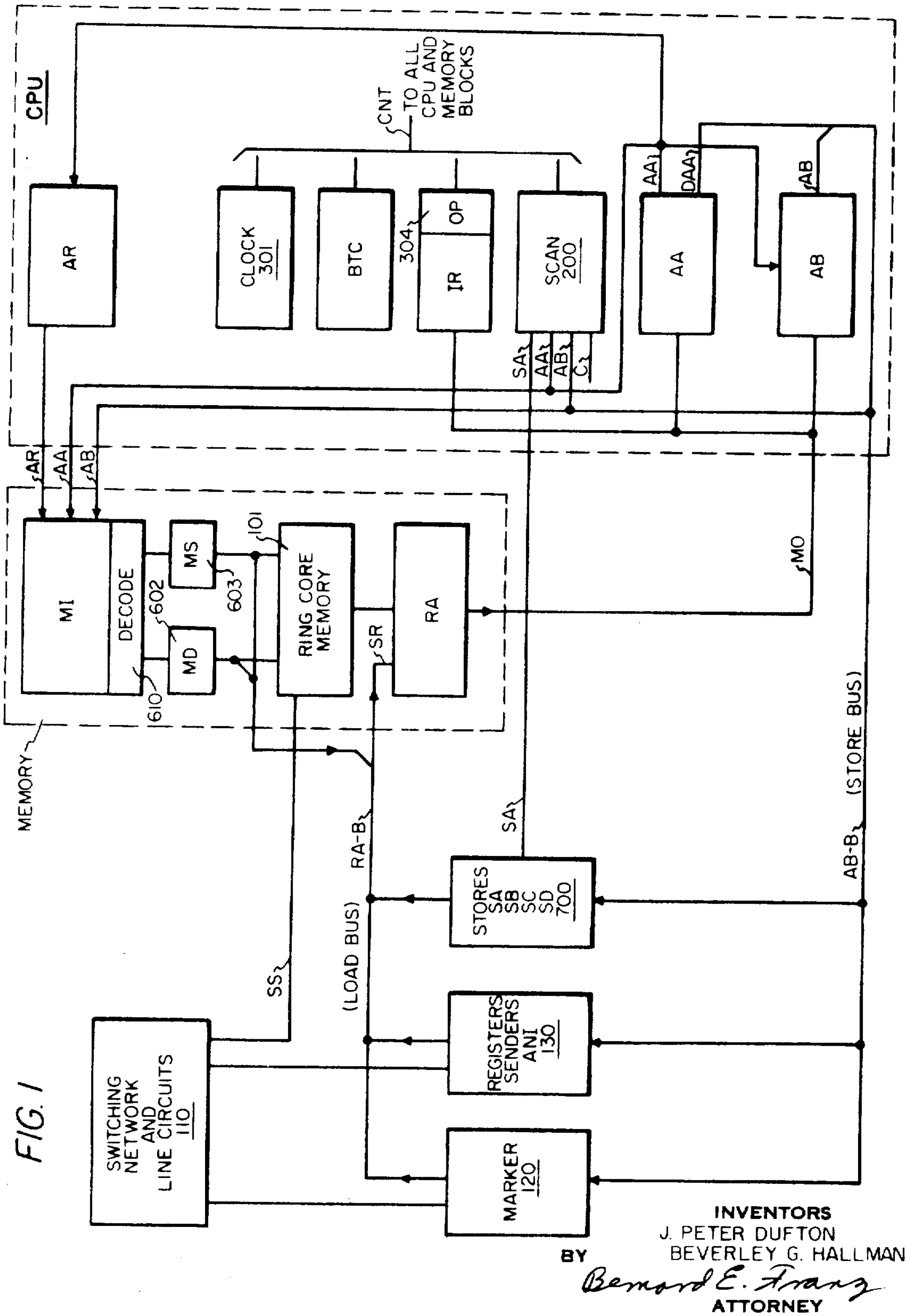
FIG. 1 is a block diagram of a telephone switching system, showing particularly the central processing unit, the memory, and some of its subsystems which include temporary memory registers.

As shown in the block diagram of FIG. 1, the data processing system includes a memory and a central processing unit CPU. The central processing unIt includes a clock 301 for supplying the basic timing signals, a bit time counter BTC which supplies the signals for the operation cycle for each instruction, an instruction register IR with an operation code (OP) decoder 304 which supplies the operation code for controlling the logic circuits, accumulator registers AA and AB, an address register AR and a SCAN unit 200.

The memory subsystem comprises basically a ring-core memory 101, with a memory input register MI having decoding circuits 610 for supplying input signals to memory drivers 602 and memory switches 603, and output read amplifiers RA. Storage registers (SA, SB, SC and SD) 700 may be considered to be part of the central processing unit, and are connected to the memory drivers and memory switches, and to the read amplifiers to form a portion of the temporary memory for the system.

The data processing system forms part of a telephone switching system to control a switching network and line circuits 110. A marker 120 contains registers forming part of the temporary memory of the system, and has circuits for controlling the switching network 110. The system also includes registers, senders and ANI (Automatic Number Identification) units 130 which also include registers forming part of the temporary memory, and have connections to the switching network 110.

Figure 6:
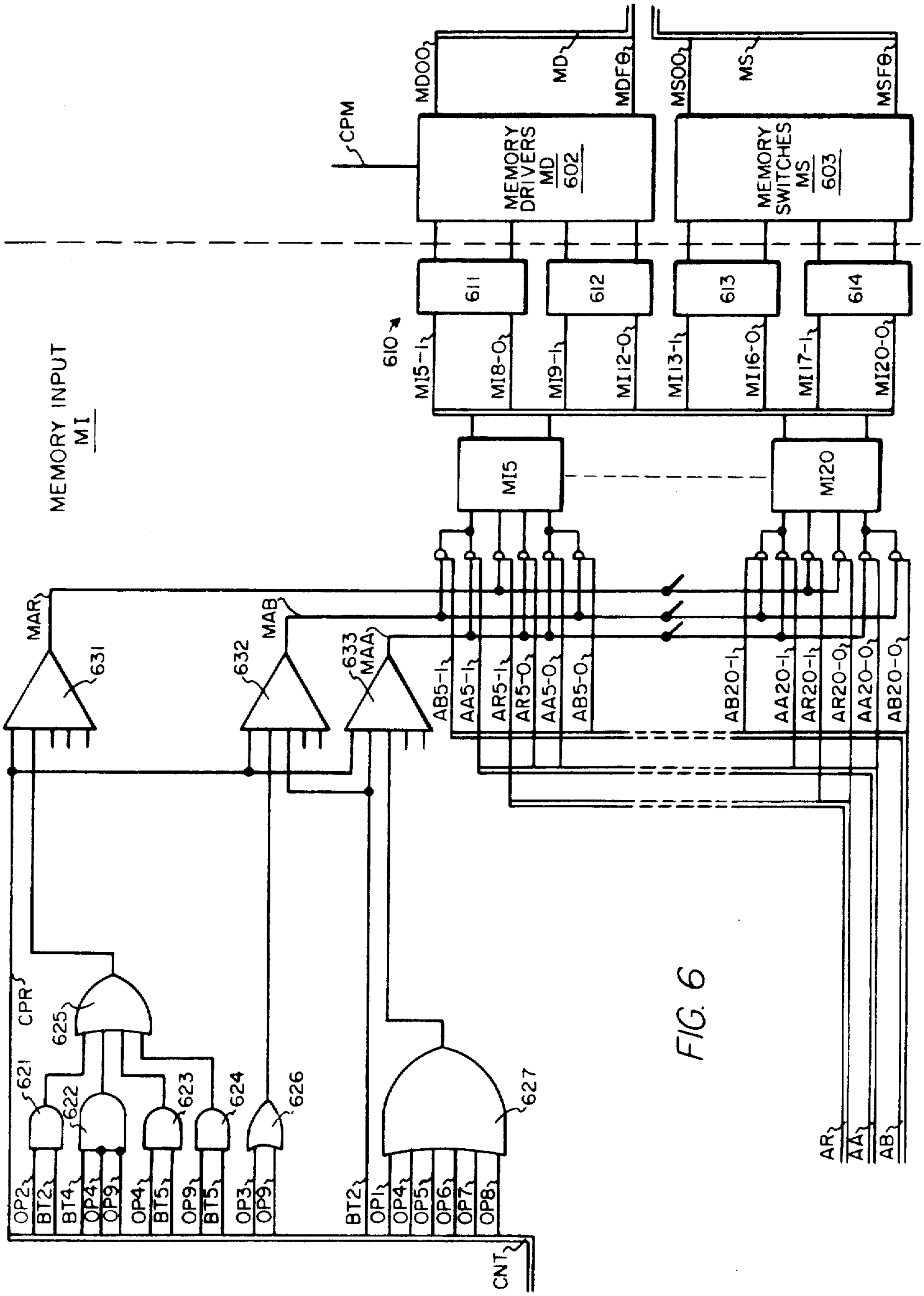
Figure 7:
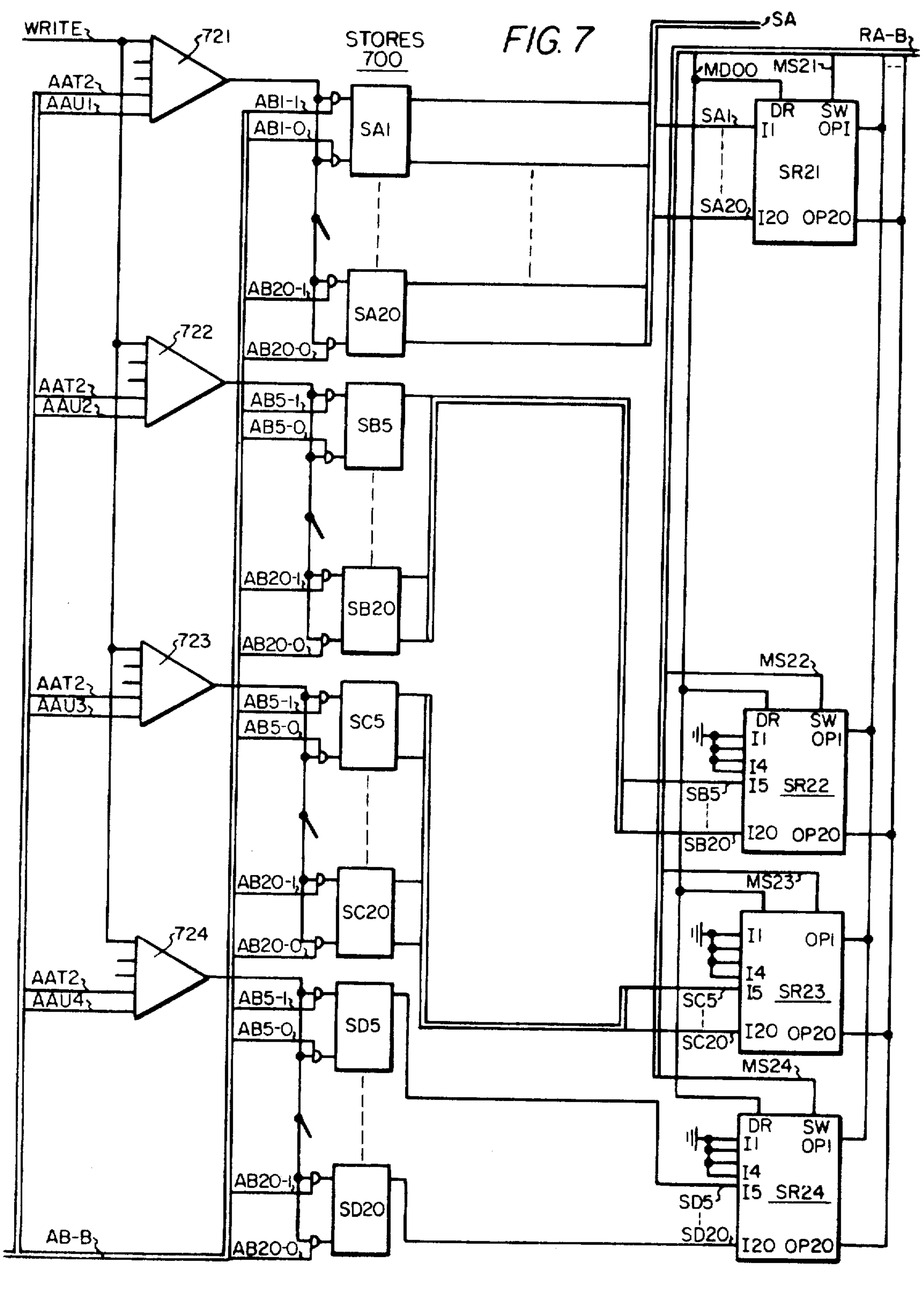

The arrangement shown in FIG. 1 represents a modification of the Small Exchange Stored Program Switching System disclosed in said Duthie et al., patent. In that patent the central processing unit is shown in FIGS. 6 and 7. The clock 301, bit time counter BTC and instruction register 303 with decoder 304 shown herein correspond to the clock 601, bit time counter 602, instruction register flip-flops IR1–4 and OP code decoder 605 shown in the patent. The address register AR corresponds to the current address counter comprising flip-flops CAC5–20 in the patent. The accumulator AA herein replaces the memory output register flip-flops MOR1–20 and the address portion IR5–20 of the instruction register of the patent. The accumulator AB herein corresponds generally to the accumulator flip-flops ACC1–20 and associated arithmetic circuits in FIG. 7 of the patent. The memory input register MI and decoding circuits 610 correspond generally to the circuits shown in FIG. 2 of the patent. The modifications of the memory output circuits as used in the system of FIG. 1 herein are disclosed in detail in the said memory arrangement patent application by Thomas. There are detailed modifications of all of the circuits of FIG. 1 with respect to those disclosed in the Duthie et al patent.

The basic logic circuits used herein are generally the same as those disclosed in the Duthie et al patent. The logic levels are a negative 8 volts for "1", and ground potential for "0". An open circuit is also used for the logic level "1", the output of a logic module generally being from the unbiased collector electrode of a transistor which is in the cutoff condition for the "1" state, and the negative biasing potential being supplied at the inputs of the succeeding logic modules. The clock pulses as now used in the system comprise trains of negative pulses, which are a train of pulses on the lead CPM (FIG. 3) of 3 microseconds duration recurring every ten microseconds and a train of pulses on lead CPR of 0.7 microseconds, with the leading edge of the CPR pulses occurring in coincidence with the trailing edges of the CPM pulses. The actual logic circuits as used in the system are principally NOR gates, but are disclosed herein as AND and OR gates to improve the clarity. As stated at column 5 of the Duthie et al. patent, some of the building block circuits are disclosed in Prescher et al. Pat. No. 3,173,994, FIG. 21. The symbols for the AND and OR gates as used herein have been changed to conform to current practice. Referring for example to FIG. 4, block 413 represents an AND gate and block 415 represents an OR gate, with a circle at an input or output as shown for example at gate 414 representing an inversion or inhibit function. The gated pulse amplifier circuits such as 411 are generally similar to circuit 201 shown in FIG. 5 of the Duthie et al. patent, except for the number of DC control inputs. The upper input of the circuit is an AC clock pulse input and the lower four inputs are DC control inputs connected as an AND function. Therefore when all four of the inputs are at the logic level " 1" or open circuited a clock pulse at the upper input is gated and amplified to the output. The various decoding circuits generally comprise AND gates such as that shown in block 511 of the Duthie et al patent. The flip-flops such as AR5 have a number of set inputs shown on the left side on the upper half and a number of reset inputs shown on the left side on the lower half. Each input is from a coincidence gate represented by a small semicircle on which the input at the center left is an AC clock input and the input from the top or bottom of the left side is a DC control input, with the DC input required to be present for a certain time before the occurrence of the clock pulse input to be effective to change the state of the flip-flop.

There are several gates and gated pulse amplifiers actually used in the system, not shown herein, which are used for amplification and distribution of the signals. For example the busses include several such gating circuits to different groups of units, and also separately to odd and even numbered units for reliability. Thus connections disclosed and claimed herein, while shown as simple conductors, may in actual practice include circuits which repeat the signals.

A memory word comprises twenty bits organized as five digits of four bits each. For instruction words, the first digit is the operation code and the other four digits are an operand address.

The operation codes (OP codes) with their assembler mnemonics are as follows:

LOAD (OP 1) — read the contents of the operand memory address location and place the result in the accumulator AB.

STORE (OP 2) — write the contents of the accumulator AB into the operand memory address location.

TRANS (OP 3) — transfer the contents of the address location stored in the accumulator AB into the accumulator AB. (The operand part of the instruction is blank).

COMP (OP 4) — compare the contents of the accumulator AB with the contents of the operand address location as read into accumulator AA. If equal, proceed to the neat instruction in sequence by incrementing the address register by 1 as normal. If unequal, skip one address in the program.

ADD (OP 5) — add 1, 10 or 100 (literals stored at operand address location) to the contents of the accumulator AB.

BR (OP 6) — branch to the instruction at the operand address location.

MASK (OP 7) — mask the contents of the accumulator AB with the contents from the operand address location as read into accumulator AA. Keep the digit where one's are present and set to zero where zero's are present (logical AND).

SUPER (OP 8) — superimpose on the accumulator AB the contents of the operand memory address as read into accumulator AA (logical OR).

SCAN (OP 9) — make an associative search beginning with the address in the accumulator AB. (The operand part of the instruction is blank). When the contents of the accumulator AA compare with the contents of the storage register SA, the search is completed and the next address is used. When the contents of accumulator AB and a wired constant C compare, skip one address in the program. Note that the necessary data must be placed in the register SA and the accumulator AB before this OP code is called upon.

Figure 2:
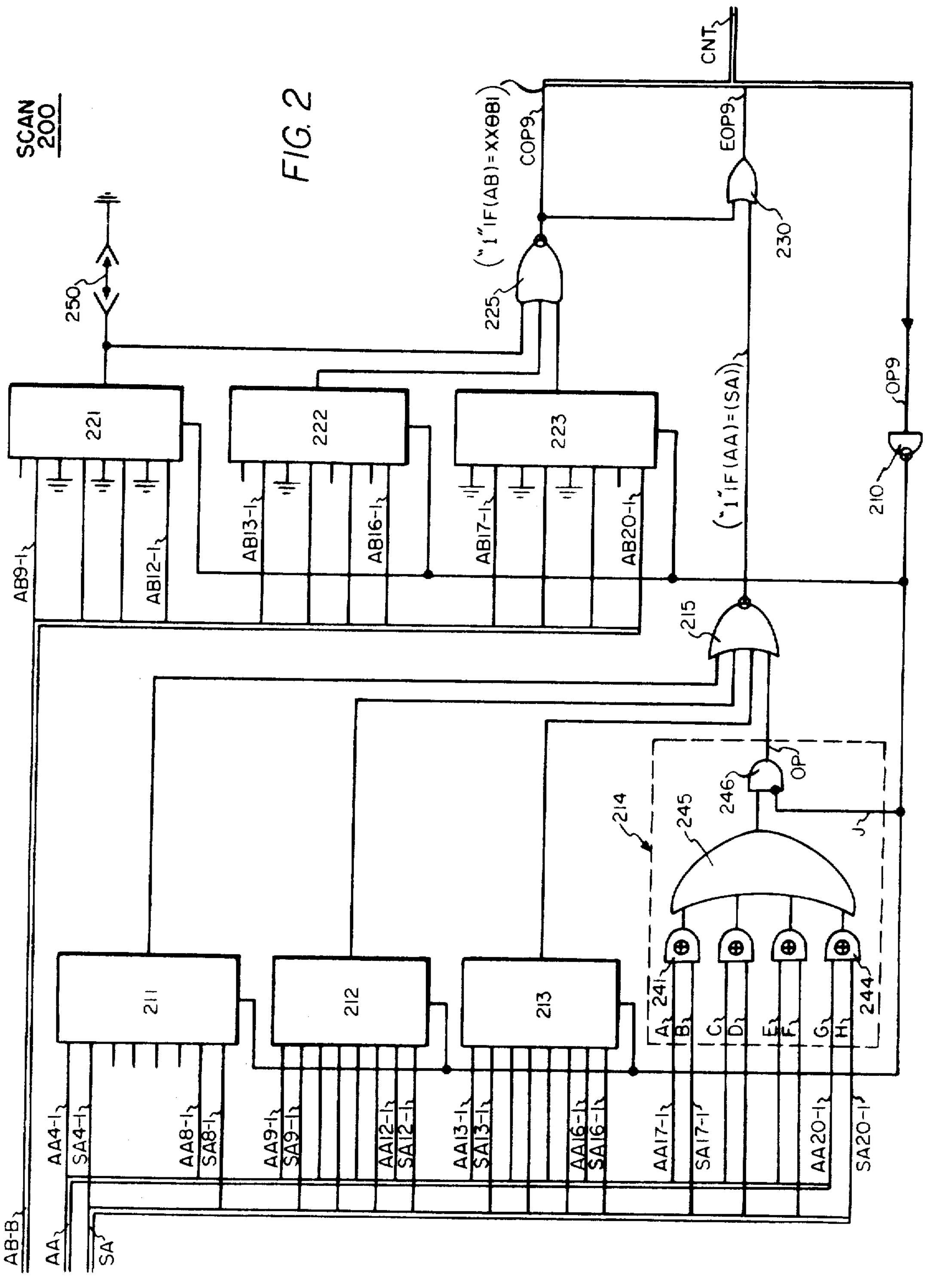
FIG. 2 is a functional block diagram of the comparators used for the operation code SCAN.

The comparison circuits for the SCAN operation are shown in FIG. 2. The basic comparison modules 211–214 and 221–223 each provide for comparing one set of four inputs to a corresponding set of four inputs. These modules may be of the type disclosed in U.S. Pat. No. 3,478,314 by W. R. Wedmore for a Transistorized Exclusive-OR Comparator. Block 214 is a symbolic functional equivalent of the module. It includes four exclusive OR gates 241–244, followed by an OR gate 245 and an output inhibit AND gate 246 to the output conductor OP. Each of the exclusive OR gates comprises a transistor with the two inputs connected via resistance and diode bias circuits to the base and emitter electrodes, the collector electrodes of the four transistors are connected together at a common point, and thence through a resistance-capacitance network to the base electrode of an output transistor, and the collector electrode of this last transistor is connected to the output lead OP. Another input from a terminal J is connected through a resistance network to the base electrode of the output transistor to act as an inhibit input. The Boolean equation for the Wedmore circuit or for the generally equivalent logic of block 214 is:

$$OP = \bar{J}\,(A\bar{B} + \bar{A}B + C\bar{D} + \bar{C}D + E\bar{F} + \bar{E}F + G\bar{H} + \bar{G}H)$$

The outputs of the four comparator modules 211-214 are connected to respective inputs of a NOR gate 215. The J inputs of the four modules are connected in common to the same source. The result is that if the logic level at input J is "0" and the signals on two sets of inputs compare so that each signal in one set is equal to its respective signal in the other set then the output of the NOR gate 215 is a "1". The specific inputs in this case are the set of conductors AA (from accumulator AA) and the set of conductors SA (from the store register SA). For the particular system requirements the first comparator module 211 has its upper pair of inputs connected to the leads from the fourth bit position of each of the conductor sets AA and SA and its lower pair of inputs to the eighth bit positions; while the inputs for the other three comparator modules run from the ninth bit position of each set at the upper inputs of module 212 to the leads from the twentieth bit position of each set at the lower inputs of module 214; corresponding to the last three digit positions of the data stored in the accumulator AA and the storage register SA.

The three comparator modules 221–223 along with NOR gate 225 are used in a similar manner to compare the contents of the last three digit positions of the accumulator AB with a wired constant. The specific constant shown has the value θB1 corresponding to the binary number 1010 1011 0001, with the 1's and 0's provided by open circuit and ground potentials respectively. Thus if a five digit number is stored in the accumulator AB, the first two digits may be any value as far as operation of comparator is concerned which may be indicated by an X; so that the output of NOR gate 225 has the value of "1" if the contents of the accumulator AB has the value XXθB1. this signal appears on the lead COP9 in FIG. 2.

To appreciate the significance of the particular constant, please note that the sixteen possible values for the four-bit binary coded digit are as explained in column 7 of the Duthie et al. patent are 0 for the null value 0000, followed by the values 1–9, then θ for the value 1010 followed by the values B–F in which the bits have the weight 8-4-2-1. The symbol θ is used to correspond to the 0 of telephone directory numbers because it is usually transmitted as 10 pulses in dialing. Thus each digit position of a directory number may have any one of the 10 values 1–θ, and for a block of a thousand numbers they may have the value X111–Xθθθ. Thus if a block of one thousand numbers is being scanned the last number would have the value Xθθθ. The operation of the counting circuits is such that the last three digits for the next count would have the value θB1; so that this constant indicates that all thousand numbers have been scanned and the counter has advanced to the next step.

An option is provided in the comparison circuits to connect the output of the comparator module 221 via a strap 250 to a ground terminal, which has the effect of eliminating the corresponding digit from the comparison so that only the last two digits are compared and the constant becomes equal to XXXB1, which permits 100 numbers to be scanned at a time.

The J inputs of both sets of comparator circuits 211–214 and 221–223 are connected via the output of an inverter 210 from the conductor OP9 from the instruction register decoder. The outputs from the two NOR gates 215 and 225 are connected to respective inputs of an OR gate 230, the output of which is connected to a conductor EOP9. Thus when the signal OP9 is "1"; and when the contents of accumulator AB has its last three digits (or two digits if the wired option is used) are equal to the constant the signals on leads COP9 and EOP9 both become "1"; and when the contents of accumulator AA compare to the contents of the store register SA the output of NOR gate 215 is "1" which causes the signal on lead EOP9 to also be "1".

In an alternative embodiment not shown the inputs for the constant at the comparator modules 221–223 may be connected to the outputs of another temporary memory register, so that any desired constant may be stored therein under programmed control for use in making the comparison.

Figure 3:
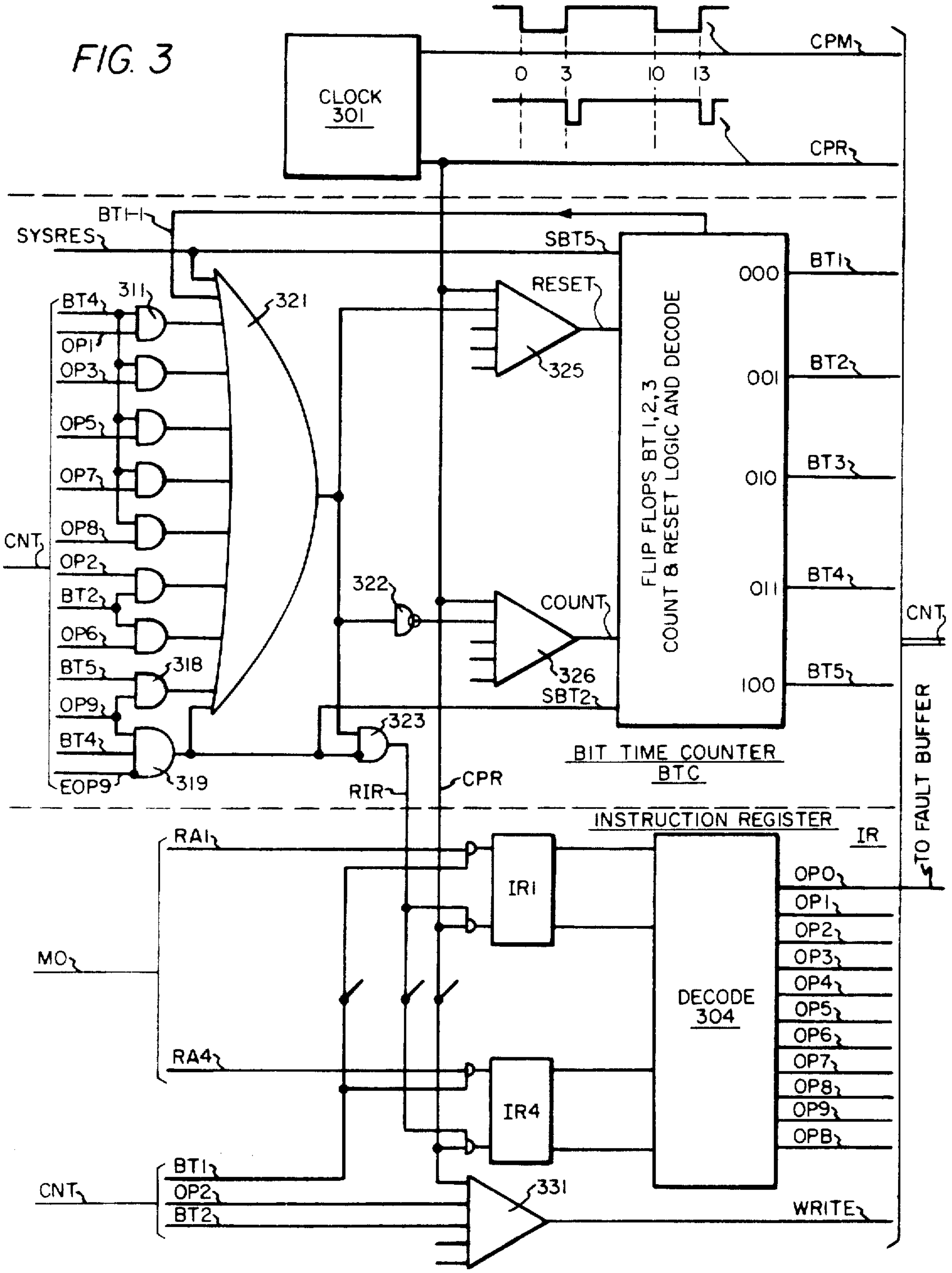
FIGS. 3–7 are functional block diagrams of the registers and logic circuits of other portions of the central processing unit, of the memory input, and of general storage registers.
Figure 4:
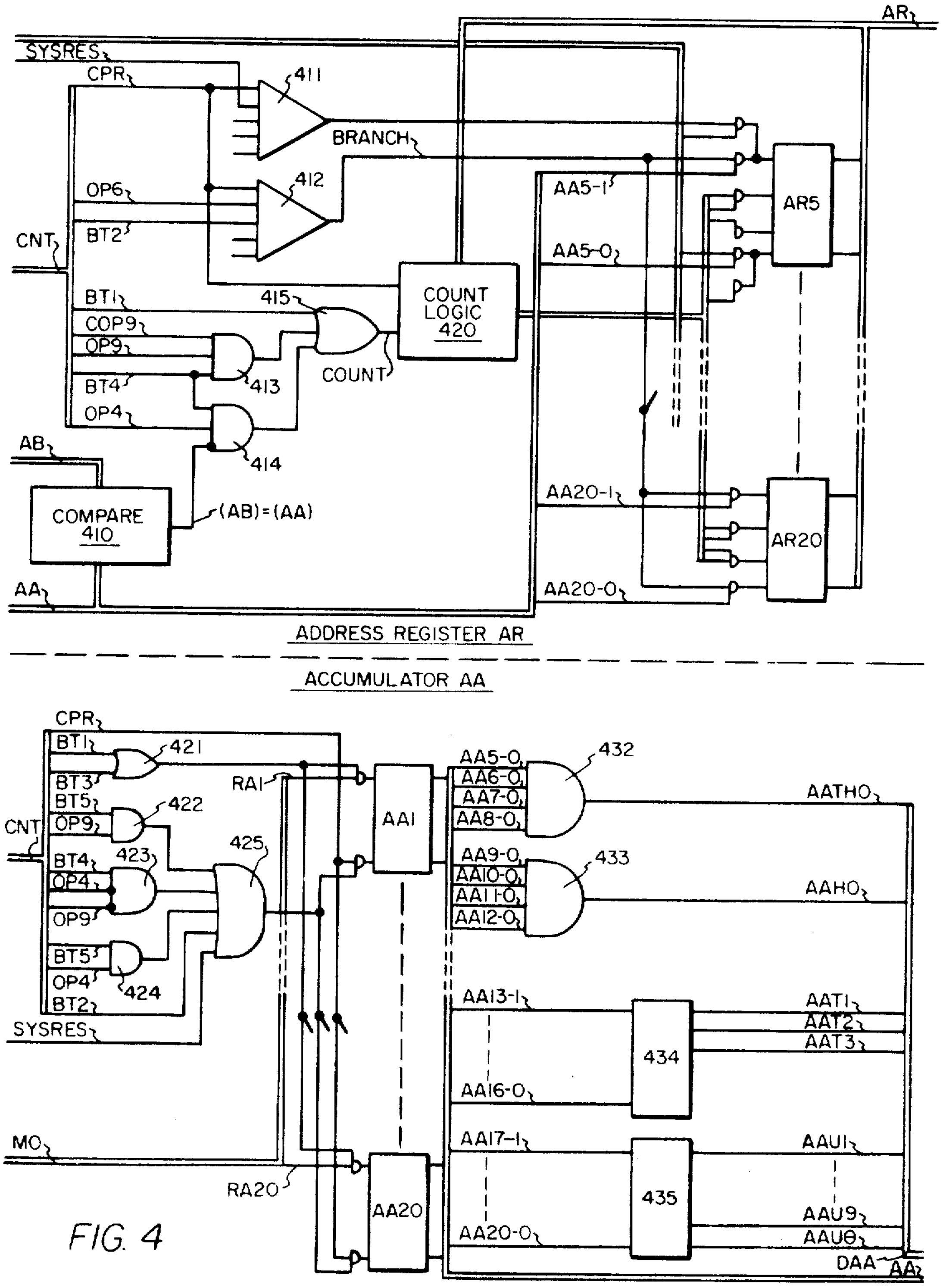

In FIG. 3 the clock is shown as block 301 which supplies the recurring pulse trains as indicated by the graphs on lead CPM and CPR. The pulses on lead CPM are used principally to enable the memory driver circuits, and the pulses on lead CPR are used as AC inputs to the gated pulse amplifiers and the coincidence gates of the flip-flops to control the timing of the change of state.

The bit time counter BTC counts from one to five. Every operation (OP) code begins with bit time BT1 and the counter advances by one on every CPR clock pulse. However some operations can be conducted in fewer bit times than others. The counter comprises three flip-flops BT1, BT2, and BT3, which along with the counting and reset logic and decoding circuits is represented by block 310. The states of the flip-flops for each output state are shown along the right side of this block, the state 000 being decoded as output BT1, etc. up to the state 100 being decoded as output BT5. The counter advances by one or resets on each pulse from lead CPR as controlled by the gated pulse amplifiers 325 and 326. Normally the output of OR gate 321 is at the level "0" so that the gated pulse amplifier 325 is inhibited and gated pulse amplifier 326 is enabled via inverter 322, so that the counter advances on each occurrence of a pulse on lead CPR. Reset is controlled by gates 311–319 connected to the inputs of OR gate 321. State BT4 causes resetting for codes OP1, OP3, OP5, OP7 and OP8; state BT2 causes resetting for codes OP2 and OP6, and for code OP9 the resetting may occur either with state BT4 or BT5. Also any time the flip-flop BT1 is in the set state, which will only occur for state BT5, the signal on lead BT1–1 will cause reset. The system reset signal on lead SYSRES also enables the reset and via the signal on lead SBT5 in conjunction with the signal on lead RESET forces the counter to state BT5. A signal on lead SBT2 in conjunction with the signal on lead RESET will force the counter to state BT2.

Code OP9 is the only operation code which will cause the bit time counter to reset to a state other than BT1. If comparison is not found, that is the contents of accumulator register AA are not the same as the contents of the storage register SA, and the address in the accumulator AB is nor equal to the constant, then the signal on lead EOP9 is at "0"; so that during the state BT4 gate 319 has at its output the signal condition "1". This causes the signals on leads SBT2 and RESET to be "1" so that the counter is set to state BT2. When either comparison indicates equality, then the signal on lead EOP9 is at signal level "1" so that gate 319 is inhibited and the counter advances to state BT5. Then on the next clock pulse the output from gate 318 will produce the reset condition to change the state to BT1. Thus it may be seen that when the central processor is in the state with code OP9, which is the SCAN mode, the bit time counter recycles skipping state BT1 and goes directly from state BT4 to BT2. Since state BT1 is the state for reading instructions from the memory, no instruction is read and the processor remains in the same state OP9.

The instruction register IR comprises four flip-flops IR1–4. This register receives information in parallel from the memory output read amplifiers via leads RA1–4 during interval BT1, the signal on lead BT1 supplying the DC input to the set coincidence gates, and the signals on leads RA1–4 supplying the AC inputs to load the flip-flops. The information stored in these flip-flops is the operation (OP) code, which is decoded by the logic 304. The output on lead OP0 is an invalid code which indicates that an instruction was not read, probably due to an open diode or other fault in the memory; so this output is used by the fault buffer. The outputs OP1–OP9 correspond to the operation code previously described. Since the digit comprises four bits the output could be expanded to a maximum of fifteen outputs other than the zero output. One such additional output OPB is shown.

A reset control from gate 323 associated with the bit time counter BTC provides a means of setting the instruction register back to zero after the execution of each instruction by supplying a DC input to the reset coincidence gates, with the lead CPR connected to the AC inputs to clock the reset. Note that the reset command is supplied whenever a signal is received from the OR gate 321 for resetting the bit time counter flip-flops; except that it is inhibited by the output of gate 319 during the SCAN operation for code OP9. This permits the instruction register to remain set at the state OP9 while the bit time counter cycles skipping the interval BT1.

A gated pulse amplifier 331 enabled by DC signals on leads OP2 and BT2 gates a clock pulse from lead CPR to generate a signal on lead WRITE, which is used to write the information into the temporary memory flip-flops during the STORE operation.

The outputs of the clock 301, the bit time counter BTC and the instruction register IR are shown combined as a set of conductors CNT, at least some of these signals being used by most of the other blocks of a central processing unit and also the memory input register.

The address register AR in FIG. 4 stores the address to be executed next. It comprises flip-flops AR5–20 and associated logic circuits. The count logic circuits 420 cause the address to be incremented by one during the occurrence of a pulse on lead CPR when the signal on lead COUNT is "1", which occurs via OR gate 415 every cycle curing the first bit time interval by the signal on lead BT1, and also conditionally during interval BT4 for the execution of codes OP4 and OP9.

The compare logic for code OP4 shown as block 410 (which is not part of the address register but is shown here for convenience) compares the contents of the accumulator registers AA and AB, and supplies an output signal which inhibits gate 414 when the comparison indicates that the contents are equal. Thus if a comparison is true the register advances only once during the cycle on the occurrence of a signal on lead BT4 as normal and the next instruction in sequence is executed next; while if the comparison indicates an inequality of the two sets of data, gate 414 is not inhibited so that during the occurrence of signal on lead BT4 the register is advanced an additional step causing one instruction to be skipped.

During the SCAN operation (OP9) the address register is incremented once during the first cycle when the instruction is read during the interval BT1 as normal, and during subsequent cycles the interval BT1 is skipped by the bit time counter so that the address register does not advance further. The end of the operation occurs when a comparison is found in FIG. 2 either via gate 215 or 225, which can never occur at the same time. A "1" output from gate 215 indicates that the associative search has been completed by finding the word having the data corresponding to that in the register SA; in which case no further signal is supplied to the address register and the instruction already there is used next. However, if the address stored in accumulator AB which corresponds to the wired constant is reached, then the signal on lead COP9 at gate 413 during the occurrence of interval BT4 causes the address register to be incremented one additional step, so that an instruction is skipped. This causes entering a segment of a program to store data indicating that the search should be continued at a later time in the program, or that the search is to be terminated upon not finding a matching condition.

The branch instruction command OP6 along with the signal on lead BT2 is used to enable gated pulse amplifier 412 to pass a pulse from lead CPR to supply AC signals to set and reset inputs of the flip-flops to load data from the accumulator AA.

In addition the reset signal on lead SYRES enables gated pulse amplifier 411 to supply reset signals to set the register to designated start addresses for the main or standby programs.

The accumulator AA comprises 20 flip-flops AA1–20. This register receives the information in parallel from the memory output read amplifiers via the 20 leads RA1–20 to the AC set inputs; the DC inputs being enabled during bit time intervals BT1 and BT3 via OR gate 421. The register is reset by a pulse on lead CPR when the reset DC inputs are enabled by a signal from OR gate 425; which occurs during interval BT2 of every cycle, during interval BT5 for the codes OP9 and OP4 via gates 422 and 424 respectively, during interval BT4 for all other operation codes via gate 423, and also when the system reset signal is present on lead SYSRES.

The output of accumulator register AA is also used for the STORE operation code OP2 during the interval BT2 as the operand address indicating into which register the information from accumulator AB is to be written. The output for the digit AA5–8 is decoded by gate 432 as the thousands digit on lead AATHO, and for the digit AA9–12 by gate 433 as the hundreds digit on lead AAHO, since these two digits for the temporary addresses are always 00. The digit AA13–16 is decoded by logic 434 to provide the tens digits AAT1, AAT2, or AAT3; and the digit AA17–20 is decoded by logic 435 to provide a units digit signal on one of the leads AAU1–AAU0.

Figure 5:
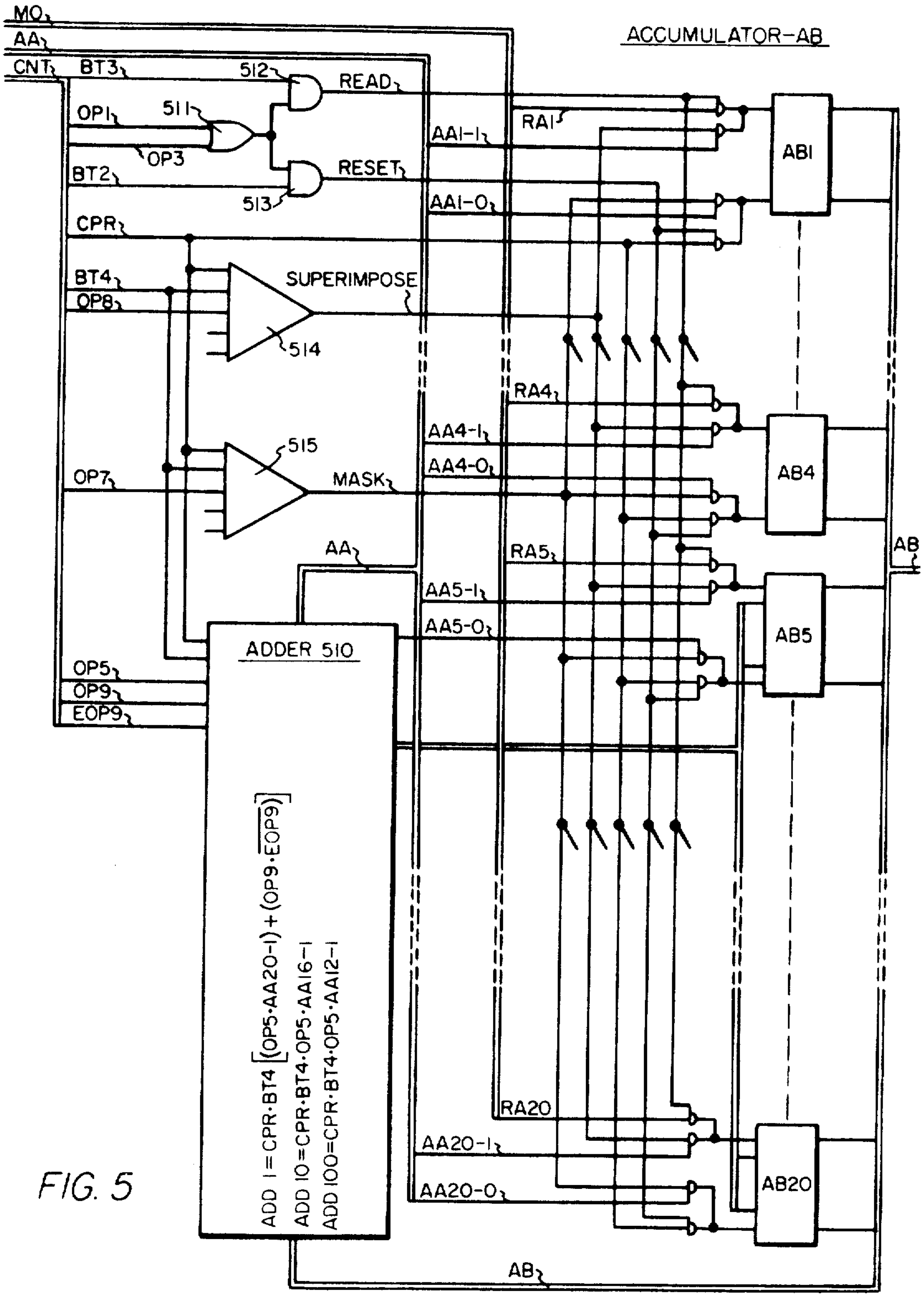

The accumulator AB shown in FIG. 5 comprises 20 flip-flops AB1–20. This register stores the output result for most of the operations, and also supplies part of the input data for many of them.

For the store and transfer operations, accumulator AB receives information directly from the memory output read amplifiers via the conductors RA1–20 to the AC inputs of one set of coincidence gates. For these operations the code OP1 or OP3 via OR gate 511 enables gates 512 and 513 so that during the bit time interval BT2 gate 513 supplies DC reset commands to a set of coincidence gates to reset all of the flip-flops on the occurrence of a pulse on lead CPR, and then during the interval BT3 gate 512 supplies a read command to the DC inputs of the set coincidence gates to load the information from the memory output.

Adder logic 510 provides the addition logic indicated by the Boolean equations within the box. This logic includes set and reset coincidence gates for the flip-flops AB5–20 having AC inputs from lead CPR, and logic for the DC inputs thereof which is actuated during bit time BT4 to add 1, 10 or 100 to the contents of the flip-flops AB5-20. For the add operation OP5, the data 1, 10 or 100 is stored in accumulator AA as a bit in the corresponding one of the flip-flops AA20, AA16 or AA12 respectively. For the SCAN operation OP9, the address in flip-flops AB5-20 is incremented by one during bit time BT4 as long as the signal on lead EOP9 has a value "0".

The mask and superimpose operations OP7 and OP8 control the gated pulse amplifier 515, 514 respectively during the interval BT4 to supply a clock pulse from lead CPR to the AC inputs of coincidence gates to cause information from accumulator AA at the DC inputs of the coincidence gates to be masked via reset inputs, or superimposed via set inputs respectively.

The memory input register MI comprises flip-flops MI5–20, as shown in FIG. 6. The instruction for the next cycle is transferred from the address register AR via the leads AR5–1 to AR20–0 inclusive connected to the DC inputs of respective coincidence gates; which are clocked via signals from gated pulse amplifier 631 when enabled by a DC signal from OR gate 625, which occurs during bit time BT2 for code OP2 via gate 621, during bit time BT5 during codes OP4 or OP5 via gates 623 or 624 respectively, and for other code, during bit time BT4 via gate 622.

The data address from accumulator AB is transferred via DC inputs of set and reset coincidence gates which receive AC input pulses from gated pulse amplifier 632 when enabled during bit time BT2 and the operation codes OP3 or OP9 via OR gate 626.

The data address from accumulator register AA is transferred via DC inputs of set and reset coincidence gates which are clocked via a signal from gated pulse amplifier 633 when enabled during bit time BT2 and any of the operation codes OP1, OP4, OP5, OP6, OP7 or OP8 via OR gate 627. The output of the memory input register is decoded via the circuits 610 comprising logic circuits 611 for the first address digit from flip-flops MI5-8, decoding logic 612 for the second address digit from flip-flops MI9–12, via decoding logic 613 for the third digit from flip-flops MI13–16, and decoding logic 614 for the fourth digit from flip-flops MI17–20. The first two digits are used by the memory drivers 602 which require an enabling clock pulse on lead CPM. The last two digits are used by the memory switches 603.

As shown in FIG. 7, a storage register SA comprising flip-flops SA1–20 has an address 0021, a storage register SB comprising flip-flops SB5–20 has an address 0022, a storage register SC comprising flip-flops SC5–20 has an address 0023, and a storage register SD comprising flip-flops SD5–20 has an address 0024. Data may be stored in these registers from the accumulator AB via connections to the DC inputs of set and reset coincidence gates as shown. During the store operation in interval BT2 the signal on lead WRITE from gated pulse amplifier 231 (FIG. 3) supplies a clock pulse to the four gated pulse amplifiers 721–724. If one of these gated pulse amplifiers has its address stored in accumulator AA the signals from the set of conductors DAA via bus AB–B enables its DC inputs so that the clock pulse is gated to the AC inputs of the coincidence gates of the corresponding storage register to cause a transfer of the data from accumulator AB. To load information from one of these storage registers into the accumulator AB during the load operation one of the storage readout circuits SR21–SR24 is used. These storage readout circuits are disclosed in said Memory Arrangement patent application by R. M. Thomas. Each of them has an input shown via bus RA-B from the memory driver MD00, and from the memory switches on one of the leads MS21–MS24 corresponding to the last two digits of its address. When both the memory driver and the memory switch of one of the storage readout circuits is enabled the data from the corresponding storage register is supplied via the set of conductors comprising bus RA-B to the read amplifiers 102 (FIG. 1) and then via the memory output bus MO to accumulator AB.

The output from the flip-flops SA1–20 is also supplied via the set of conductors SA to the scan unit 200 for use in the SCAN operation OP9.

SUMMARY OF SCAN OPERATION

From the above description it may be seen that to perform an associative search using the SCAN operation code OP9, it is first necessary to store data corresponding to the subject of the search into the storage register SA, and to transfer a start address for the search into accumulator AB. For the scan operation no operand address is needed but only the code OP9, so that the instruction is 90000, which is read into the instruction register IR during bit time BT1. During bit time BT2 the accumulator AA is reset via NOR gate 425 in FIG. 4, and the address from accumulator AB is transferred into the memory input register using the signals via gate 626 and gated pulse amplifier 632 in FIG. 6. During bit time BT3 the data from that address is read into the accumulator AA in response to the signals from gate 421 in FIG. 4. The data in register SA is compared with the data in register AA via the comparator circuits 211–214 and NOR gate 215; and the address in the accumulator AB is compared to the constant via comparator circuits 221–223 and NOR gate 225. Assuming that inequalities are indicated by both comparisons, during bit time BT4 the adder logic 510 in FIG. 5 causes the address in the accumulator flip-flops AB5–20 to be incremented by one; and the bit time counter BTC in FIG. 3 is reset to state BT2 in response to a signal from gate 319, while the operation code stored in the instruction register stays at the value OP9. The operation then continues to cycle through the three bit time intervals BT2, BT3 and BT4 reading words in sequence from the memory and checking whether the subject data has been found or the constant address reached.

When the search is successful the signal via gates 215 and 230 to lead EOP9 inhibits the adder circuit 510 and the bit time counter control gate 319. Therefore the bit time counter BTC advances to state BT5, which causes the accumulator AA to be reset on the next occureence of a clock pulse on lead CPR in response to the signal from gate 422. The next instruction in the address register AR is to be transferred into the memory input register in response to a signal via gates 624 and 625 to the gated pulse amplifier 631. The signals on leads BT5 and OP9 via gates 318 and 321 cause the bit time counter to be reset to state BT1, and the instruction register to be reset via a signal from gate 323.

If the search is not successful and the address in the accumulator AB continued to advance to the value of the wired constant, then the comparison signal from gate 225 makes the signals on leads COP9 and EOP9 both "1". The signal on lead COP9 at gate 413 causes the address register AR to advance one additional step, and the signal on lead EOP9 causes all of the other operations to occur the same as if the search were successful. The effect is that one instruction is skipped by the additional advance of the address register. This takes the program to a sequence of instructions to put a new start address into one of the temporary memory registers so that the program will return at a later time and make a search of another set of addresses; or the search may be terminated if all possible addresses have been scanned without finding a match with the data in register SA.

The SCAN operation using code OP9 may be used for automatic number identification in a telephone switching system in which case the data loaded into the register SA is the equipment number of a calling line, and the address in accumulator AB is a directory number, so that the operation has the effect of translating the calling line equipment number into its directory number. Additional possibilities for the use of this operation code include the function of one, two, or three digit translations using the scanning technique with translation tables, which would give a highly flexible translation capability. Another possibility is for speed calling or abbreviated dialing, in which the location of the calling subscriber's repertory table might be achieved by scanning through a table of the speed calling subscribers until the entry corresponding to the calling subscriber is encountered.

What is claimed is:

1. In a digital data processing system having a central processing unit and a memory;

wherein the memory comprises a plurality of word stores for program words and data words, the program words having a first part for an operation code and a second part for an operand, a memory input register for addresses designating the individual word stores, access means connected to read out a word from a store corresponding to the address in the memory input register and to supply signals representing the word to a set of memory output conductors;

wherein the central processing unit comprises memory output register means, an accumulator, an instruction register, arithmetic circuits, a store register, and interconnections among them and to the memory input register and memory output conductors, operation cycling means providing operation cycles;

wherein the combination of the central processing unit and memory includes operation means effective during each operation cycle with a first step using said access means to read out one program word from memory with the operation code into the instruction register and the operand into the memory output register means, and in following steps using the arithmetic circuits to perform an operation designated by the operation code, which for some operation codes includes placing a data word address into the memory input register and using the access means to read out a corresponding data word into the memory output register means, and means effective during the operation cycle to place an address of a program word into the memory input register for the next operation;

the improvement wherein one of said operation codes is a scan-control operation code, and said arithmetic circuits include scan apparatus comprising first and second comparison means, each of which comprises two sets of inputs with each input of one set compared with a corresponding input of the other set, an enabling input, and an output, and means for supplying an enabling signal at the enabling input to produce an output indicative of equality or non-equality of the two sets of inputs;

the first comparison means having its two sets of inputs coupled respectively to outputs of the memory output register and outputs of said store register, the second comparison means having one set of inputs coupled to certain outputs of the accumulator and the other set of inputs to a source representing a given constant for comparing a portion of an address to said constant, which is used to detect addresses to end the scan, both comparison means having the enabling input coupled to an output for the scan-control code from the instruction register; and their outputs connected to effect the operation described below;

wherein the scan apparatus in combination with the central processing unit and memory includes means responsive to the scan-control operation code in the instruction register to place a word representing an address from the accumulator into the memory input register and using said access means to read out a word from the memory at that address into the memory output register means for said comparison operation, means responsive to non-equality signals from both comparison means to add "1" to the word in the accumulator, means to reset the operation cycling means to skip said first step, means to place the resulting word from the accumulator into the memory input register and using said access means to read out the word from the memory of that address into the memory output register means and repeat the comparison operation;

means alternatively responsive to an equality output signal from the first comparison means to place one program word address into the memory input register, means alternatively responsive to an equality output signal from the second comparison means to place a different program word address into the memory input register, and means responsive to the equality output signal being from either comparison means to cause proceeding to the first step of the next operation cycle in which the corresponding program word is read out.

* * * * *